United States Patent
Thompson

(10) Patent No.: US 7,867,423 B2
(45) Date of Patent: Jan. 11, 2011

(54) MOULD LINING

(75) Inventor: Ewan Fergus Thompson, Derby (GB)

(73) Assignee: Rolls-Royce PLC (GB)

( * ) Notice: Subject to any disclaimer, the term of this patent is extended or adjusted under 35 U.S.C. 154(b) by 0 days.

(21) Appl. No.: 12/025,165

(22) Filed: Feb. 4, 2008

(65) Prior Publication Data

US 2008/0203612 A1  Aug. 28, 2008

(30) Foreign Application Priority Data

Feb. 27, 2007 (GB) ................... 0703819.3

(51) Int. Cl.
B29C 33/42 (2006.01)
(52) U.S. Cl. .................... 264/219; 264/313; 425/78
(58) Field of Classification Search ............... 264/220, 264/219, 313; 425/78
See application file for complete search history.

(56) References Cited

U.S. PATENT DOCUMENTS

| | | | | |
|---|---|---|---|---|
| 1,832,515 | A * | 11/1931 | Webster | 451/548 |
| 3,677,951 | A * | 7/1972 | Alles | 248/363 |
| 3,844,527 | A * | 10/1974 | Scott | 249/189 |
| 4,810,452 | A | 3/1989 | Taillefert et al. | |
| 5,498,146 | A * | 3/1996 | Ritter et al. | 425/78 |
| 6,966,932 | B1 | 11/2005 | Schroeder | |
| 2005/0111776 | A1* | 5/2005 | Martin et al. | 385/14 |
| 2006/0019587 | A1* | 1/2006 | Deopura et al. | 451/526 |

FOREIGN PATENT DOCUMENTS

| | | |
|---|---|---|
| EP | 1348529 A1 | 1/2003 |
| FR | 2561587 | 3/1984 |
| GB | 1409418 | 10/1975 |
| GB | 2118909 A | 11/1983 |
| GB | 2231527 A | 11/1990 |
| GB | 2259883 A | 3/1993 |
| NL | 8401415 | 12/1985 |

* cited by examiner

*Primary Examiner*—Joseph S Del Sole
*Assistant Examiner*—James Sanders
(74) *Attorney, Agent, or Firm*—McCormick, Paulding & Huber LLP

(57) ABSTRACT

Powder metallurgy techniques are utilised to form components and in particular titanium components in moulds. By the nature of the powder forming process, closed surfaces are created in the powder formed component, particularly when hot iso-static pressing techniques are utilised. In order to create surface texturing, and in particular entrant features, a mould lining is associated such that it reciprocates the shape of an underlying mould. The mould lining incorporates surface discontinuities such as holes, slots, spots or folds which result, once the moulded material is formed, in entrant features which can be utilised to enhance bonding through adhesives or other surface features beneficial to a component.

11 Claims, 1 Drawing Sheet

MOULD LINING

CROSS-REFERENCE TO RELATED APPLICATION

This application is entitled to the benefit of British Patent Application No. GB 0703819.3 filed on Feb. 27, 2007.

FIELD OF THE INVENTION

The present invention relates to mould linings and more particularly to mould linings and methods of moulding utilizing a powder moulding technique.

BACKGROUND OF THE INVENTION

It is known to utilize powder metallurgy in order to produce components and parts. In one variant of such moulding processes a titanium powder is placed within a mould, which is then sealed, evacuated and hot iso-statically pressed to consolidate the moulded component or part. Generally, the mould is formed from an erodible material such as steel, which can be dissolved away using nitric acid to leave the moulded material part behind. There are other press consolidation techniques, which could apply or casting processes used to form components in moulds.

Unfortunately, due to the closed nature of steel and similar materials utilised to form moulds for powder metallurgy moulding using hot iso-static pressing techniques, the formed part similarly has a closed surface. Nevertheless, it is desirable to bond particularly titanium and other metal parts to other materials such as ceramics or composite substrates. Titanium can be hard to bond and normally a surface preparation is required. Current surface preparations cannot easily produce tiny re-entrant features that an adhesive can flow into and help lock the titanium to other materials such as a composite substrate. The lack of a good or adequate bond can cause the part to fail as the titanium and composite parts peel off each other.

SUMMARY OF THE INVENTION

In accordance with the present invention, a mould adapted to receive a mould material, and includes a member having a surface with a topography, a mould lining having a deformable material to replicate the mould member surface topography, and wherein, the lining has surface discontinuities formed in the formable material as re-entrant features for texturing the mould material presented within the mould.

According to another aspect of the present invention, a mould lining adapted for use in a mould that has member with a surface with a topography, includes a formable material that can deform to replicate the mould surface topography and has surface discontinuities formed in the formable material as re-entrant features for texturing a moulded material.

According to still another aspect of the present invention, a method of moulding includes the steps of forming a mould having a member with surface with a topography, applying a mould lining to the mould surface so as to replicate the mould providing surface discontinuities in the mould lining as re-entrant features and presenting a material to the mould for moulding whereby the moulded material is textured by the surface discontinuities.

DETAILED DESCRIPTION OF THE PREFERRED EMBODIMENTS

Figure 1:
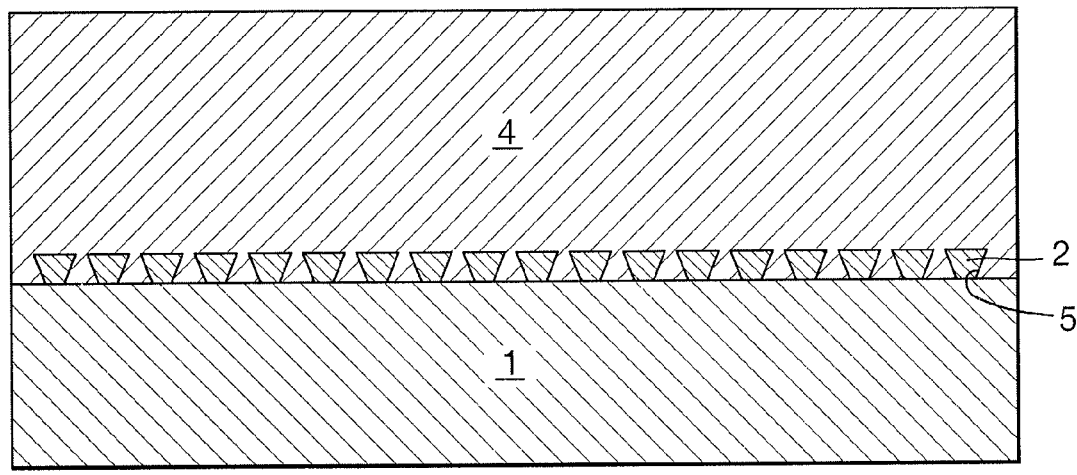
FIG. 1 is a schematic illustration at the interface between a mould and a mouldable material with a mould lining in accordance with aspects of the present invention therebetween; and, FIG. 2 is a schematic illustration of the moulded material formed in a mould in accordance with aspects of the present invention.

As indicated above, the nature of powdered metallurgy moulding particularly in relation to titanium powders utilised to form components and parts results in a surface which is overly smooth and therefore has no re-entrant features into which adhesive can flow in order to lock titanium with other materials such as a composite substrate. In accordance with aspects of the present invention such surface texturing to provide re-entrant features in a moulded material is achieved through providing surface discontinuities in a mould lining located within a mould to be utilised to form components.

The material from which the mould lining is formed will depend upon subsequent processing. As indicated, with regard to titanium powder it is known to utilize steel as the mould such that, in accordance with aspects of the present invention, the mould lining may similarly be formed from a thin layer of steel, which is formable enough to be applied to the inner surface of the mould.

The mould lining will incorporate surface discontinuities. The surface discontinuities may comprise holes, slots, folds, spots or corrugations. With regard to holes and slots it will be appreciated these slots may partially extend through the mould lining or completely through the mould lining. In any event, the surface discontinuities will be of a relatively tiny nature in comparison with the eventual thickness of moulded material in the final product formed within the mould in accordance with aspects of the present invention. It will be understood if the surface features in the form of holes extend completely through the mould lining, problems with respect to blistering where air may be trapped between the lining and the mould when associated may be reduced through the air passages provided by the holes or slots. However, the holes or slots may also allow powder to pass through them causing separation between the lining and the mould about the holes or slots resulting in "lift-off" blips. Provided these blips are limited they may be advantageous as surface discontinuities for adhesion.

The mould lining, as indicated, is typically a sheet or foil readily formable such that it can be compressed or forced into replication of an underlying mould. However, other techniques such as plating or electro-forming can also be used to provide the mould lining. The mould lining may incorporate the surface discontinuities prior to association with a mould or the surface discontinuities provided within the mould lining once located within the mould. Furthermore, where applicable, the mould lining may incorporate an initial pattern of discontinuities of a general nature and specific localized surface discontinuities created within the mould lining where greater adhesion may be required in the finally formed product from the moulded material.

The surface discontinuities can be created by any appropriate technique. With regard to holes and slots these techniques may include punching and laser drilling. It will also be appreciated where the surface discontinuities do not extend completely through the mould lining, the surface discontinuities may be impressed into the mould lining by an appropriate roller or other technique.

As the purpose of the surface discontinuities is to create texturing in the form of entrant features for keying and lock association with an adhesive, it will be understood that creating three-dimensional surface discontinuities may be beneficial. In terms of three dimensions, it is meant that the surface discontinuities vary laterally, horizontally and vertically such that the adhesive will flow into textured features for key bonding. Typically, three-dimensional structuring to the surface discontinuities will include a conical or wedge shape as appropriate.

It will also be understood that surface discontinuities can be created by folding and corrugating the mould lining surface to create roughening on a marginal surface scale but generally such approaches will create smooth undulations which may not provide sufficient entrant features for adhesive keying in accordance with preferred lock association between the finely formed moulded material and other materials such as composites.

FIG. 1 provides a schematic illustration of a mould interface in accordance with aspects of the present invention. It will be appreciated that this interface will be substantially repeated about the whole mould surface upon which the moulded material will be formed. As can be seen, the mould 1 has a mould lining 2 located upon its inner surface upon which a moulded material is formed. The mould lining 2 incorporates surface discontinuities 4 which, in the embodiment depicted in FIG. 1, are wedges or cones. In such circumstances, the moulded material enters the surface discontinuities 4 to create entrant features 4. Once the mould 1 and mould lining 2 are removed it will then be understood that the moulded material as cast and moulded will retain these entrant features 5 such that an adhesive will enter these features in order to create a strong bond with other parts such as composites.

Figure 2:
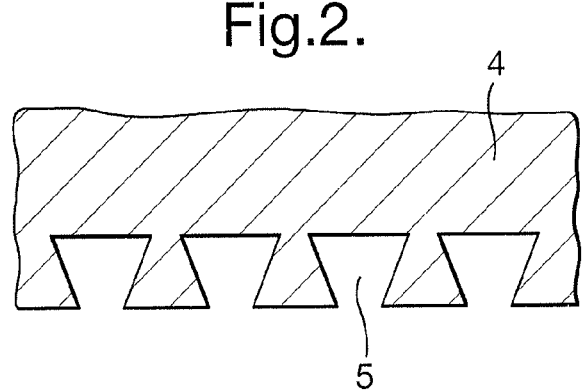

FIG. 2 illustrates a possible surface cross section of the moulded material formed in a mould or by a method in accordance with aspects of the present invention. Thus, the material 4 has entrant features 5 which, as indicated, can allow inward flow of adhesive to form generally a stronger bond in use. Clearly, the depth in particular of these entrant features 5 is determined by the configuration of the surface discontinuities as described above. In order not to substantially affect the moulded shape of the moulded material and therefore create variations in the part or component formed by the moulded material, it will be understood that the discontinuities 5 are relatively tiny and generally only in the order of a few microns in depth.

FIGS. 1 and 2 illustrate entrant features 5 and surface discontinuities, which are generally regularly distributed within the moulded material. However, the actual distribution, size and shaping can be changed as required for particular object circumstances.

In terms of the method of moulding in accordance with aspects of the present invention, it will be appreciated that the moulded material as presented to the mould should be sufficiently fine that it can itself enter and fill the surface discontinuities. Titanium powder utilised in accordance with powder metallurgical techniques is sufficiently fine to allow, as indicated, small surface discontinuities to be provided which are adequate to create entrant features for adhesive keying as described above. In such circumstances the original moulded material typically in fine powder form is located within the mould with a liner in accordance with aspects of the present invention. The powder will enter and engage the surface discontinuities and therefore will be appropriately packed to fill the mould with a mould lining in accordance with aspects of the present invention. The mould will then be sealed, evacuated and the moulded material generally formed in accordance with hot iso-static pressing techniques. However, for some shapes simple mechanical pressing will also be appropriate. Once the moulded material has been formed, the mould is removed. This removal can be through an appropriate machining technique or potentially erosion through etching with a corrosive such as for example nitric acid with regard to mould and mould linings formed from steel. In some circumstances the mould can be designed to be re-usable if it can be removed, reconditioned if necessary and cleaned before re-association with a mould. It will also be understood that the removal technique will also remove the thin mould liner. By such an approach it will be understood that the moulded material as formed will incorporate effectively a negative of the surface discontinuity features incorporated within the mould lining. This will take the form of a series of tiny protrusions with recesses or entrant features 5, as described above, between them which can engage an adhesive for a strong bond. The entrant features 5 can be conical or wedge shaped etc., dependent upon requirements. Thus, the surface discontinuities and produced surface texturing may have three-dimensional variations for adhesive keying.

It will be appreciated that the entrant features will generally have a trivial depth in comparison with the thickness of the moulded material to form the component. In such circumstances, although there will be a large number of tiny protrusions, it will be necessary to appropriately wash and process the moulded material to ensure that the mould lining is completely or partially removed or etched away as appropriate to leave sufficient of the entrant features 5 as described above for purpose. Normally, the surface features created by aspects of the present invention will have a depth less than 1% of the thickness of the formed moulded material.

By use of a mould lining and method in accordance with aspects of the present invention, the moulded material as formed remains ideally sized and shaped with regard to object dimensions defined by the base mould but incorporates surface entrant features to engage through an adhesive or resin layer with another component such as a ceramic element. In short, the entrant features 5 aid bonding to the moulded material.

Aspects of the present invention essentially achieve surface preparation of the moulded material at relatively low cost and utilizing base powder metallurgy to form the moulded material. As indicated, particularly with powder formed titanium parts, the surface preparation provided by aspects of the present invention will allow use of adhesives to create stronger bonding with other components or materials particularly ceramics and composites.

Aspects of the present invention depend upon the ability to find an appropriate material to form the mould lining to allow that mould lining to be dissolved or otherwise removed without harming the finally formed component or part in the moulded material. It is by providing a mould lining which is selectively dissolvable or otherwise removable from the moulded material, which allows retention of the surface entrant features. In such circumstances, particular choice of combinations of moulded material and material from which the mould lining is provided will depend upon circumstances but generally the mould lining will be formed from a metal. In such circumstances, aspects of the present invention can be applied to form any component using powder metallurgy provided an appropriate lining material can be provided which can then be removed by etching or other processes.

Surface roughening or texturing achieved by aspects of the present invention may be utilised for purposes other than providing enhanced bonding through an adhesive. For example, surface texturing may create roughening which may increase the surface co-efficient friction of the finally formed component or reduce its reflectivity or otherwise alter the performance of the finally formed component in the moulded material to meet desired objectives.

It will be understood that use of a mould lining in accordance with aspects of the present invention allows creation of surface discontinuities in that lining rather than in the base substrate mould itself. In such circumstances, where the moulded material as formed can be removed from the base mould, that is to say the mould is open, it will be understood the lining may similarly be removed from the base or substrate mould attached to the formed moulded material. In such circumstances, rather than the whole substrate mould being dissolved away and therefore lost, only the mould lining will be sacrificial to leave behind surface entrant features as indicated above. It will also be appreciated that through use of a mould liner in accordance with aspects of the present invention during a development phase different configurations of mould lining in terms of surface discontinuities may be used to determine a best distribution of surface features to achieve desired results, whether that be enhanced bonding, roughening or reduced reflectivity. It will generally be easier to form the surface features in the mould lining rather than in the base mould itself so that the ability to test different texturing of the moulded material as formed can be more readily achieved through use of a lining in accordance with aspects of the present invention. Surface discontinuities may be distributed in a pattern to alter texturing selectively across the formed component. Thus, with bonding for example different bond strengths may be achievable in order that more predictable failure at the weaker bond site may be provided.

Modifications and alterations to aspects of the present invention will be appreciated by those skilled in the art. Thus, it will be appreciated that potentially the moulded material when flowing into the surface discontinuities may leak beneath those surface discontinuities between the surface discontinuity and the wall surface of the base mould. This may be detrimental. In such circumstances, edges of the surface discontinuities may incorporate a seal compound to limit such leakage of moulded material and therefore possible detrimental effects in use.

What is claimed is:

1. A method of moulding comprising the steps of:
   forming a mould with a member having a surface with a topography;
   applying a mould lining to said mould surface so as to replicate the mould providing surface discontinuities in said mould lining as re-entrant features, the surface discontinuities having three dimensional variations including at least one of holes, slots, folds, spots and corrugations defining a discontinuity surface area, and having a shape such that when viewed from a direction transverse to the moulded material contact surface an entirety of the discontinuity surface area is not visible; wherein the surface discontinuities have a depth less than 1% of the moulded material thickness once formed, wherein the moulded material thickness once formed is defined by the width of the inner cavity of the mould less a thickness of the mould lining; and
   presenting a material to the mould for moulding whereby the moulded material is textured by the surface discontinuities.

2. A method as claimed in claim 1 wherein the surface discontinuities are formed by the step of punching or laser drilling or over-pressing.

3. A method as claimed in claim 1 wherein the surface discontinuities are formed by the step of rolling.

4. A method as claimed in claim 1 wherein three dimensional variations create conical or wedge shapes in the surface discontinuities.

5. A method as claimed in claim 1 wherein the moulded material is formed by the step of a hot iso-static pressing for retention of the texturing of the moulded material.

6. A mould having an inner cavity adapted to receive a mould material for hot iso-static pressing the mould material and creating a texture thereon to facilitate the bonding of the mould material to other materials, the mould comprising:
   a member at least partially defining the inner cavity and having a surface with a topography:
   a mould lining having a deformable material to replicate the mould member surface topography and having a mould material contact surface to which the mould material is presented;
   wherein, the lining has surface discontinuities formed in said formable material as re-entrant features for texturing the mould material presented within the mould, the surface discontinuities having three dimensional variations including at least one of holes, slots, folds, spots and corrugations defining a discontinuity surface area, and having a shape such that when viewed from a direction transverse to the mould material contact surface an entirety of the discontinuity surface area is not visible;
   wherein the surface discontinuities have a depth less than 1% of the moulded material thickness once formed; and
   wherein the moulded material thinkness once formed is defined by the width of the inner cavity of the mould less a thickness of the mould lining.

7. A mould as claimed in claim 6 wherein the surface discontinuities are formed by the step of punching or laser drilling or over-pressing.

8. A mould as claimed in claim 6 wherein the surface discontinuities are formed by the step of rolling.

9. A mould as claimed in claim 6 wherein the surface discontinuities have three dimensional variations.

10. A mould as claimed in claim 9 wherein the three dimensional variations create conical or wedge shapes in the surface discontinuities.

11. A lining as claimed in claim 6 wherein the lining is dissolvable.

* * * * *